(No Model.)
W. PORTEOUS.
STRAIGHT WAY VALVE.
No. 406,179. Patented July 2, 1889.
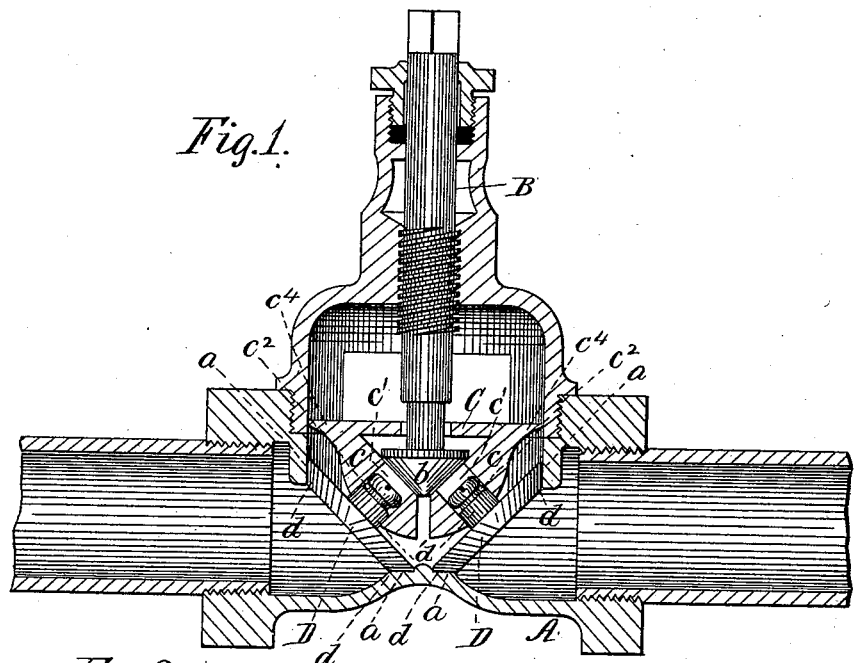
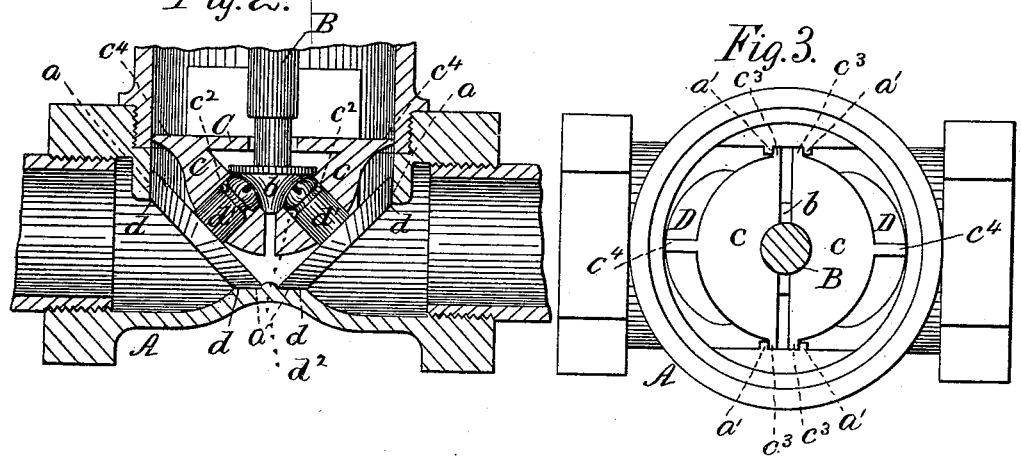
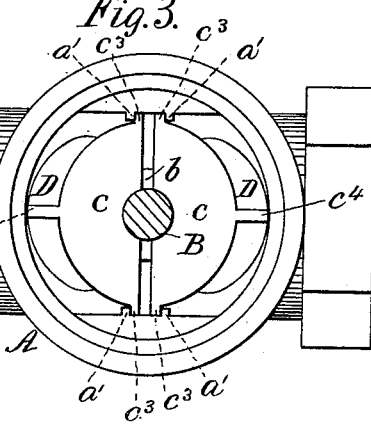
Witnesses:
James A. Ramsey
Frank O. Lockland
Inventor:
William Porteous
by Parkinson & Parkinson
his Attorneys.

UNITED STATES PATENT OFFICE.

WILLIAM PORTEOUS, OF ELMWOOD PLACE, OHIO.

STRAIGHT-WAY VALVE.

SPECIFICATION forming part of Letters Patent No. 406,179, dated July 2, 1889.

Application filed May 4, 1888. Serial No. 272,759. (No model.)

*To all whom it may concern:*

Be it known that I, WILLIAM PORTEOUS, a citizen of the United States, residing at Elmwood Place, in the county of Hamilton and State of Ohio, have invented a certain new and useful Improvement in Straight-Way Valves, of which the following is a specification.

My invention relates to that class of straight-way valves in which the disks forming the valves are forced to their seats by the action of a wedge or equivalent device; and its object is to provide a valve of simple construction which can be quickly and economically finished, the bearings of which can be readily reground, which will clear the ports by a moderate lift, and which will be free from liability to clog.

The invention consists in the novel construction and arrangement of the parts.

In the drawings, Figure 1 is a sectional view of a valve-case and valve embodying my invention; Fig. 2, a sectional view of a valve-case and valve, showing my invention in a slightly-modified form; Fig. 3, a top view of a valve-case containing a valve embodying my invention.

A is the valve-case, which is provided with inclined valve-seats $a$ $a$.

B is a threaded valve-stem carrying at its lower end a wedge-piece $b$, preferably circular in cross-section, the form shown in Fig. 1 being conical and that shown in Fig. 2 being coniform, but of a shape as if generated by a line curving outward instead of by a straight line. The valve-stem is adapted to support a sectional valve-carrier C, illustrated as consisting of two parts $c$ $c$. Each section of the valve-carrier has a recess adapted to take over the wedge-piece. In the form shown, the upper edges of the wedge-piece project beyond the shank of the stem and take under the hood or roof of the recesses, thereby supporting the valve-carrier, the sections of which are held against escape by the valve-case. The interior or recessed faces of the valve-carrier are adapted to engage with the inclined face of the wedge-piece.

D D are valve disks or faces, preferably having inclined bearing-surfaces $d$ $d$, adapted to engage with the inclined valve-seats $a$ $a$. The valve-disks are secured to the valve-carrier by a stem $d'$, taking into an opening $c$ in the valve-carrier, and secured to the valve-carrier in such manner as to permit of rotary movement of the disk relatively to the carrier, thus insuring a practically uniform wearing of the bearing-surfaces of the disks.

In the form shown the stem is provided with an annular groove $d^2$, and is held in place by a rod or pin $c^2$, taking through the valve-carrier and engaging with the annular groove. The faces of the valve-carrier adjacent to the valve-disks are preferably curved, to permit ready rotation of the valve-faces.

The respective sections of the valve-carrier are preferably provided with projections $c^3$, adapted to slide in grooves in the valve-case. These grooves are shown as formed by projections $a'$, and they serve as guides for the valve-carrier.

The valve-seats are preferably inclined at an angle of forty-five degrees to the line of direction of the pipe. This allows the seats to be finished from the opening into which the bonnet screws. The incoming fluid does not exert a direct pressure, forcing the valve against the opposite wall of the casing, as is the case with straight-way valves of the ordinary construction, and much of the friction caused by this pressure is avoided. The valve-faces do not need to extend below the ports, and the ports are cleared by a shorter lift than in known valves of this general class.

The angle of inclination may be varied in either direction without departing from my invention, so long as the seats can still be finished from the bonnet-opening. It is obvious, however, that better results will be obtained if the angle of inclination is forty-five degrees, or substantially that. The several angles of the valve-body are also preferably forty-five degrees, or substantially that, thus enabling the finishing of the valve and the tipping of the holes to be done in a revolving chuck without removing the valve therefrom.

In the known valves which are seated by the action of a wedge there is considerable friction in seating and unseating the valve, and consequent wear of the parts. This friction is largely avoided by the construction herein described.

I am aware that a valve has been made in two parts encircled by a rubber band, and that it is also old to swivel the valve-disks to a solid swiveled carrier, and to such plans I make no claim.

I claim—

1. In a straight-way valve, the combination, with a shell or casing, of a valve-stem provided with a wedge-piece, a divided valve-carrier loosely connected to the stem, and valve-disks swiveled in the carrier, substantially as and for the purpose described.

2. In a straight-way valve, the combination, with the shell or casing provided with valve-seats at an angle of about forty-five degrees, of a valve-stem provided with a wedge-piece, a divided valve-carrier connected with the stem and adapted to move a limited distance relatively thereto, and a valve-disk swiveled in each half of the carrier.

3. In a straight-way valve, the combination, with a shell or case provided with inclined valve-seats, of a valve-stem provided with a wedge-piece, a valve-carrier loosely mounted upon the stem and divided transversely, at right angles to the bore of the valve, and valve-disks swiveled in the carrier.

4. In a straight-way valve, the combination, with a shell or casing provided with inclined valve-seats, of a stem screwing into the shell and provided with a wedge-piece at its lower end, a divided valve-carrier provided with a recess to receive the wedge-piece and to permit a limited independent movement thereof, and valve-disks swiveled to the carrier.

5. In combination with a case or shell provided with inclined valve-seats, a valve-stem provided with a wedge-piece and screwing into the shell, a divided valve-carrier loosely connected to the stem, and valve-disks swiveled to the carrier.

6. The combination, in a straight-way valve, of a valve-stem, a wedge-piece, a sectional valve-carrier, rotary valve-disks supported thereby, and a valve-case having inclined valve-seats, substantially as and for the purpose specified.

7. The combination, in a straight-way valve, of a threaded valve-stem, a coniform wedge-piece carried thereby, a sectional valve-carrier having inclined external faces, rotary valve-disks secured to the respective sections of the valve-carrier, and a valve-case having inclined valve-seats, substantially as specified.

8. In a straight-way valve, the combination of the sectional valve-carrier C, the rotary valve-disks D, having grooved stems $d'$, and the pins $c^2$, substantially as and for the purpose specified.

9. In a straight-way valve, the threaded valve-stem B, wedge-piece $b$, the sectional valve-carrier C, the rotary valve-disks D, the guides $a'$ $c^3$, substantially as and for the purpose specified.

WM. PORTEOUS.

Witnesses:
F. HOLZ,
AUGUST F. HERBSLET.